United States Patent [19]

Smith

[11] E Re. 28,552

[45] Reissued Sept. 16, 1975

[54] COBALT-BASE ALLOYS

[75] Inventor: Gaylord Darrel Smith, Mountainside, N.J.

[73] Assignee: E. I. Du Pont de Nemours & Company, Wilmington, Del.

[22] Filed: Aug. 16, 1974

[21] Appl. No.: 498,230

Related U.S. Patent Documents

Reissue of:

[64] Patent No.: 3,410,732
Issued: Nov. 12, 1968
Appl. No.: 452,382
Filed: Apr. 30, 1965

[52] U.S. Cl. ..... 148/32; 29/182.5; 29/182.7; 29/182.8; 29/192; 75/171

[51] Int. Cl. ..... C22c 19/00

[58] Field of Search ..... 75/171, 170, 134 F, 122; 148/32, 32.5; 29/182, 182.5, 182.7, 29/182.8, 192

[56] References Cited

UNITED STATES PATENTS

| | | | |
|---|---|---|---|
| 2,030,342 | 2/1936 | Wissler | 75/171 |
| 2,097,177 | 10/1937 | De Golyer | 75/171 |
| 2,180,549 | 11/1939 | Prange | 75/171 |
| 3,257,178 | 6/1966 | Severns et al. | 29/194 |
| 3,361,560 | 1/1968 | Severns et al. | 75/170 |

*Primary Examiner*—R. Dean

[57] ABSTRACT

Strong, wear-resistant and corrosion-resistant products are obtainable from alloys composed of 14–30% molybdenum, 6–12% chromium, 0.5–4% silicon and at least 50% cobalt. This alloy contains 30–60 volume percent of a hard Laves phase and, correspondingly, 40–70 volume percent of a solid solution matrix phase containing about 75% by weight of cobalt.

11 Claims, No Drawings

COBALT-BASE ALLOYS

Matter enclosed in heavy brackets [ ] appears in the original patent but forms no part of this reissue specification; matter printed in italics indicates the additions made by reissue.

---

This invention relates to a cobalt alloy and, more particularly, to a novel, strong, wear-resistant, corrosion-resistant product made from the alloy and the process for making such product.

Manufacturing and processing procedures in the fields of metal extrusion, press forging, die casting, metal coining, etc. have advanced in recent years to the point where the currently-used materials for the construction of equipment are restricting further advancement. In general, the equipment used in these manufacturing procedures are made of the tool steels. These steels display satisfactory strength, toughness and fabricability but are deficient in their ability to maintain these properties at temperatures above 1000° F. Furthermore, these steels lack sufficient oxidation and corrosion resistance. Restrictions on the use of such materials is also imposed by the fact that galling will result from rubbing contact of such materials as aluminum and brass with tool steels. Hence, a material is needed that will exhibit minimum galling and wear when used as a sliding surface under conditions of low lubrication, high pressure, high temperature, severe abrasion, and the like.

It is a primary object of this invention to provide strong, heat-resistant, wear-resistant, shaped articles. It is a further object to provide a novel structural material displaying improved room temperature properties, some of which are substantially retained at elevated temperatures as high as 1000° F. or higher. It is a still further object to prescribe at least one process for obtaining this novel structural material. Other objects will appear hereinafter.

The objects are accomplished, in the preferred process, by melting amounts of cobalt, chromium, molybdenum, and silicon at a temperature of 2300–3300° F. to provide a molten composition consisting essentially of 6–12% (preferably 8–12%) chromium, 14–30% (preferably 26–28%) molybdenum, 0.1–4% (preferably 0.5–2%) silicon, at least 50% (preferably at least 54%) cobalt, all percentages being by weight; forming the molten composition into a shaped article; and cooling the article.

The novel product obtained as a result of the aforementioned process is an alloy of cobalt, chromium, molybdenum and silicon in the proportions specified above consisting essentially of a cobalt base solid solution which is strengthened, primarily, by the formation of intermetallic compounds and, secondarily, by-solid solution alloying. This strengthening is sufficient to permit these alloys to be used at room temperature as well as elevated temperatures in the as-cast or as-fabricated condition. Examination of the alloys of this invention using metallographic, chemical and X-ray diffraction techniques reveal the presence of two major phases. Specifically, the alloy was found to contain 30–60 volume percent of a hard Laves phase, structure type C-14[1] having the generic formula $Mo_2Co_3Si$; and, correspondingly, about 40–70 volume percent of a solid solution matrix phase of cobalt containing about 75% by weight of cobalt. It should be understood that small amounts of various other phases, e.g., $Co_2Si$, $Co_7Mo_6$, or various chromium or molybdenum carbides, may also be present.

[1]Pearson, "Handbook of Lattice Spacing."

Table A contains the metallographic data on selected alloys. This table lists the estimated volume percent of phases present, the kind of structure, and Knoop (100 gram load) microhardness value. The strength and hot hardness retention of these alloys are attributed to the presence of at least 30 volume percent of hard Laves phase with the relatively high hardness of the solid solution as shown by the Knoop microhardness values. The chemical composition of the two major phases was determined by electron beam microanalysis. The alloy was air cast in an induction furnace and poured into a graphite mold. The composition was made from elemental constituents and the resultant composition was verified by wet chemical analysis. The chemical composition of each phase was determined by an electron beam microanalyzer. This apparatus can determine the chemical composition of grains as small as ten microns in diameter with an accuracy of plus or minus five percent of the relative proportion of each element present. The hard phase was found to consist of 32.7% molybdenum, 7.7% chromium, 1.9% silicon, 1.5% manganese, 54.8% cobalt, balance other. The hard phase was identified by X-ray diffraction as a Laves phase, structure type C-14, of the generic formula $Mo_2Co_2Si$. The terminal solid solution of cobalt, the matrix phase, was found to consist of 13.9% molybdenum, 7.8% chromium, 0.8% silicon, 1.5% manganese, 74.5% cobalt, balance other.

TABLE A.-METALLOGRAPHIC DATA ON SELECTED ALLOYS OF THIS INVENTION

| Chemical Composition (Weight Percent) | | | | | | Hard Phase | | Matrix Phase | |
|---|---|---|---|---|---|---|---|---|---|
| Co | Mo | Cr | Si | C | Type of Microstructure | Volume Percent | Knoop Hardness | Volume Percent | Knoop Hardness |
| 57.6 | 27.8 | 12.0 | 2.0 | (1) | Nodular | 40 | 920 | 60 | 450 |
| 62.0 | 28.0 | 8.0 | 2.0 | (2) | Nodular plus laminar | 40 | 1,481 | 60 | 735 |
| 59.7 | 27.9 | 7.9 | 4.0 | 0.5 | do | 60 | 1,481 | 40 | 569 |
| 62.6 | 28.0 | 8.0 | 0.7 | 0.2 | Nodular plus eutectic | 35 | 920 | 65 | 569 |
| 63.4 | 28.0 | 8.0 | 0.1 | 0.5 | Matrix dendrites plus eutectic | 30 | 850 | 70 | 450 |

[1]0.6 Mn instead of carbon.
[2]0.01 B and 0.2 Zr instead of carbon.

As disclosed previously, the articles of the invention may be prepared by melting and casting the novel alloy compositions using conventional casting furnaces, molds, and techniques. Alternatively, such compositions may be prereacted and the reaction product reduced to powder size prior to conversion to shaped articles by cold pressing followed by sintering or by hot pressing at elevated pressures, or by melting and casting.

The articles of the invention are found to exhibit a ıumber of outstanding and surprising properties. They ıre strong and hard at room temperature and maintain hese properties to temperatures as high as 1500° F. or ıigher. While they exhibit no major elongation upon racture at room temperature, these articles exhibit satsfactory impact strengths unnotched and at least one oot pound of impact resistance in the standard Charpy V-notch test. Furthermore, these alloy articles are reistant to thermal stress, degradation by heat, air, cerain corrosive media, and molten aluminum. In the orm of dies, they are resistant to galling by the extruion of aluminum and brass. Graphite rubbing against ırticles made from alloys within the scope of the invenion at high speeds and pressures causes virtually no vear (i.e., less than one mil of wear for 100 hours of operation at 100 p.s.i. and 3500 surface ft./min.).

These properties make the alloys suitable for a variety of critical structural components, e.g., dies for exrusion, pressing, coining, casting and forging, gasoline ınd diesel engine exhaust valves, furnace fixtures, hemical seals, etc. The properties of these alloys also nake them useful where a good sliding surface is deired, e.g., seal components, sleeve bearings, bushings, alve guides, extruder liners, piston rings and sleeves.

In the preparation of these products, it is preferred to ıse commercially pure elements. Since only minor hanges in the relative proportions of the essential elenents will occur during the processing, it is possible to tart with substantially the amounts of the components hat are desired in the final product. Thus, the amounts of the element constituents desired in the ultimate product are melted in a furnace designed for melting alloys in a temperature range of 2300–3300° F. and the esulting molten composition is cast in molds or crucibles of graphite, cast iron, copper or ceramics. The composition may be melt cast in air, vacuum or in an nert atmosphere. Conventional shell and investment nolds may be used for casting the shaped objects.

In a specific process, the elemental composition is nelted in an open-air induction furnace lined with nagnesium oxide or silicon dioxide and is cast into cast ron molds. Initially, the desired amounts of cobalt and chromium are melted, after which the molybdenum ınd half of any silicon may be added. The amount of ilicon added in this step is only the amount necessary or use as a deoxidizer. If vacuum melting is used, the ilicon need not be added at this point. The final porion of silicon, which is the amount desired in the ultinate product, is added just prior to pouring the alloy composition. Any other alloy additions can also be nade at this time. Thus, calcium-silicon, ferro-silicon, or ferro-manganese may be added to deoxidize the alloy or the conventional hot-topping compound may be used to minimize porosity and pipe in the articles cast. It should be understood that the molybdenum and chromium may be added in the form of the cheaper ferro-molybdenum and ferro-chromium alloys. However, he total iron, which can substitute for part of the cobalt in excess of 50% by weight of cobalt should not exceed 10%. More than 10 % iron results in altering the ıigh temperature strength and hardness of the alloys.

As disclosed previously, the percentages of compoıents in the final composition should be essentially as ollows: 6–12% chromium, 14–30% molybdenum, 0.1–4% silicon, the remainder being cobalt in an ımount of at least 50%. Alloys outside these ranges are significantly deficient in one or more of the previously mentioned properties of the alloys of the invention. At least 0.1% silicon is necessary for minimum deoxidation and fluidity of the alloy during casting. Up to 4% silicon tends to enhance specific alloy properties, presumably by promoting the formation of Laves phase, but more than 4% silicon results in alloys that form brittle articles. Additions of more than 1.0% carbon also tend to cause excessive brittleness. Hence, it is preferred that the alloy contain 0.02–0.5% carbon as a contribution to wear resistance. Up to 2% manganese enhances toughness of the alloy by reducing the tendency for sulfur embrittlement. Other elements may be added to the compositions of this invention provided they do not have a substantially adverse effect upon one or more of the desirable properties. For example, it has been found that the iron, boron, and zirconium may be added in limited amounts for certain purposes. The addition of iron has been discussed. Boron and zirconium additions have been found to enhance the high temperature strengths of the alloys.

Another method of alloying the components and forming the shaped articles is to first premelt the composition, then reduce the resulting alloy to a powder and, thereafter, convert the powder to a shaped article. Premelting of the essential elements tends to insure uniformity of composition in the final alloy article. The premelting step involves arc-melting or induction-melting of the untreated composition followed either by atomizing to form the particulate material directly or by casting into an ingot and reducing the ingot to a powder. Reducing to a powder may be accomplished by jaw crushing the material to minus 4 mesh followed by milling in a steel or tungsten-carbide lined equipment to a fine particulate size, i.e., 95% of which will pass a minus 240 mesh screen.

The powders may readily be shaped by cold pressing in steel dies at pressures of from about 10 to 50 tons/sq. in. The cold pressed object can then be sintered or liquid phase bonded at temperatures between 2100° F. and 2500° F. for a period from less than one minute to as much as 120 minutes. The liquid phase bonding temperature is between the solidus and liquidus line for these alloy compositions. Inert gas, hydrogen, or vacuum furnace atmospheres are satisfactory and will yield dense, bright, shaped objects.

Shaped articles can also be made from the powders by hot pressing the powder in graphite dies at temperatures between 2000° F. and 2400° F at 1000 lbs./sq. in. or higher. Atmosphere control in this operation is not critical. Soaking time at the operating temperature is dependent upon the mass of the object but will usually be limited to times in the range of about 5 to 20 minutes.

The following illustrative examples constitute specific embodiments of this invention and are not intended to be limitative. In these examples, various property data are reported. The test methods by which these data are obtained are, unless otherwise stated, the standard ASTM test methods using standard ASTM specimens.

Examples 1–9

The following representative series of alloys within the scope of this invention are prepared:

| Example | Co | Mo | Cr | Si | Mn |
|---|---|---|---|---|---|
| 1 | 57.6 | 27.8 | 12.0 | 2.0 | 0.6 |
| 2 | 59.7 | 27.9 | 7.0 | 4.0 | 0.5 |
| 3[a] | 61.0 | 27.5 | 7.9 | 2.1 | 0.43 |
| 4[b] | 63.1 | 25.6 | 7.9 | 1.8 | 0.6 |
| 5[c] | 63.6 | 25.6 | 7.9 | 1.8 | 0.6 |
| 6[d] | 63.8 | 25.6 | 7.9 | 1.8 | 0.6 |
| 7 | 63.9 | 27.6 | 7.9 | 0.1 | 0.5 |
| 8 | 64.1 | 25.6 | 7.9 | 1.8 | 0.6 |
| 9 | 64.9 | 25.9 | 7.4 | 1.8 | |

[a]Also contained 0.17% B and 0.9% Zr.
[b]Also contained 1.0% C.
[c]Also contained 0.5% C.
[d]Also contained 0.3% C.

In preparing these alloys, 10 lbs. of the elemental composition is melted in an induction furnace lined with MgO and cast into graphite molds 4'' wide × 8'' deep. There is no reaction between the alloys and the graphite. Initially, the cobalt and chromium are melted and the molybdenum and half the silicon are then added. The final portion of silicon is added just prior to pouring the alloy. Any other alloy additions are also made at this time. The alloy is poured from the furnace into a ladle. Calcium-silicon is added to the ladle to flux the alloy and deoxidize the composition. The pouring temperature of 2800–3000° F. is measured by an optical pyrometer immediately before pouring the molten metal into the graphite mold. Vermiculite is used to cover the casting immediately after pouring to permit slower cooling of the ingot. Test specimens are machined from the ingots using conventional tooling procedures. Conventional grinding wheels and carbide tools are sufficient for all machining operations.

Table I lists the Rockwell A hardness ($R_A$), the ultimate tensile strength at room temperature (UTS), the unnotched impact strength (IS), the Charpy V-notch impact strength (CIS), and the results of cycling a 4'' × 4 × 1'' specimen in two examples from 400° F. to 1850° F. and back to 400° F. within 30 seconds, 100 times.

TABLE I

| Example | $R_A$ | U.T.S. (X10³ p.s.i.) | I.S. (ft. lbs.) | C.I.S. (ft. lbs.) | Effect of Cycling |
|---|---|---|---|---|---|
| 1 | 78–78 | 100 | 3.0 | 1.0 | |
| 2 | 69–70 | 84 | | | None |
| 3 | 74–75 | 91 | 3.0 | 1.0 | |
| 4 | 79–80 | 115 | 3.0 | 1.0 | |
| 5 | 78–79 | 98 | 1.5 | 1.0 | |
| 6 | 76–77 | 95 | | 1.0 | |
| 7 | 74–76 | 122 | | 1.0 | None |
| 8 | 76–76 | | | 1.0 | |
| 9 | 78–79 | 135 | | 1.0 | |

Table II shows the effect of temperature on ultimate tensile strength for some of the alloys.

TABLE II

| Example | U.T.S. (X10³ p.s.i.) Room Temp. | 1,000° F. | 1,200° F. | 1,500° F. | 1,850° F. |
|---|---|---|---|---|---|
| 2 | 84 | 73 | 79 | 66 | 28 |
| 3 | 91 | 88 | 90 | 86 | 33 |
| 7 | 122 | 125 | 113 | 108 | 28 |
| 9 | 135 | 130 | 98 | 91 | 25 |

In Table III-A, the hot hardness data for some of the alloys are compared to data on two commercial tool steels: Tool Steel A composed of 73.9% Fe, 12% Cr, 12% W, 1% V, 0.5% Si, 0.3% C and 0.3% Mn and Tool Steel B composed of 91% Fe, 5.2% Cr, 1.3% Mn, 1.1% V, 1% Si and 0.4% C. The ability of the alloys of the invention to retain their high hardness values as temperatures are elevated compared to the inability of the tool steels should be noted.

TABLE III-A

| Example | Ra 70 | Ra 60 | Ra 50 | Ra 40 |
|---|---|---|---|---|
| 2 | 1,120° F | 1,280° F | 1,390° F | 1,518° F. |
| 3 | 1,050° F | 1,240° F | 1,310° F | 1,430° F. |
| Steel A | | 760° F | 1,850° F | 1,270° F. |
| Steel B | 1,010° F | 1,150° F | 1,190° F | 1,200° F. |

Furthermore, the hardness values of the alloys of the invention are substantially unaffected by the length of time that the alloys are kept at the elevated temperature. This is shown in Table III-B.

TABLE III-B

| Example | Ra at 1,325° F. after- 15 minutes | 3 hours | 24 hours |
|---|---|---|---|
| 8 | 53 | 63 | 54 |
| Steel A | 40 | 8 | |

Table IV lists the time-to-rupture data for the alloys of Examples 3, 7 and 9. The advantages of the boron and zirconium in the alloy of Example 3 are apparent.

TABLE IV

| Example | Temp. (° F.) | Stress (p.s.i.) | Time (hrs.) | Elongation (percent in 1'') |
|---|---|---|---|---|
| 3 | 1,200 | 80,000 | 315.4 | 5.4 |
| | 1,350 | 35,000 | 909.8 | 26.2 |
| 7 | 1,200 | 80,000 | 49.8 | 4.2 |
| | 1,200 | 70,000 | 214.0 | 5.6 |
| | 1,350 | 30,000 | 288.7 | 5.7 |
| | 1,500 | 25,000 | 19.5 | 5.5 |
| 9 | 1,200 | 80,000 | 3.6 | 2.9 |
| | 1,200 | 60,000 | 270.0 | |
| | 1,350 | 30,000 | 59.4 | 8.2 |

TABLE IV-Continued

| Example | Temp. (° F.) | Stress (p.s.i.) | Time (hrs.) | Elongation (percent in 1") |
|---|---|---|---|---|
| | 1,350 | 25,000 | 148.0 | |
| | 1,500 | 20,000 | 13.7 | 17.7 |

The corrosion resistance of the alloys of the invention [ compared to a Control prepared from an alloy composition of 53.6 Co, 27.8 Mo, 16 Cr, 2 Si and 0.6 Mn ] are presented in Table V-A. [ The criticality of the 12% limit on chromium, particularly with hydrochloric acid, will be apparent.]

TABLE V-A

| Example | Av. Cor. Penetration Rate (mils/mo.) at 110° F. | | | |
|---|---|---|---|---|
| | 10% $H_2SO_4$ | 78% $H_2SO_4$ | 10% HCl | 37% HCl |
| 1 | 0.25 | 0.89 | 16.0 | 4.39 |
| 2 | 0.70 | 20.90 | 19.5 | 6.05 |
| 8 | 0.49 | 0.00 | 8.25 | 0.42 |
| 9 | 0.60 | 0.29 | 2.76 | 0.20 |
| [Control | 0.22 | 0.90 | Not resistant] | |

The oxidation resistance of the alloys of the invention are compared to commercial materials currently used as oxidation-resistant materials in Table V-B. Thus, Control A is gray cast iron (94 Fe, 3.25 C, 1.75 Si, 0.5 Mn. 0.35 P and 0.1 S) which is now used by the die casting industry to contain aluminum; and Control B is a commercial oxidation resistant alloy of 74.5 Ni, 15 Cr, 7 Fe, 2.5 Ti and 1 Cb.

TABLE V-B

| Example | Dissolution by Molten Al (in./mo.) 1,375° F. | Resistance to Still Air (mg./cm.²/100 hrs.) | |
|---|---|---|---|
| | | 1,600° F. | 1,850° F. |
| 1 | 1.86 | 1.6 | 70 |
| 2 | Not tested | 1.7 | 15.8 |
| 3 | 2.75 | 1.8 | 68 |
| 9 | 1.19 | 0.9 | 87 |
| Control A | 1.88 | | |
| Control B | | 2.2 | 13.3 |

Example 10

To illustrate the applicability of powder metallurgy techniques as a means of preparing alloys hereof, a 100-pound charge of 62% Co, 28% Mo, 8% Cr, 2% Si is atomized to minus 100 mesh powder. The atomization is accomplished by induction melting the charge and spinning the stream of molten material from a copper plate. The particles solidify as spheres as they are quenched by a stream of nitrogen or inert gas, such as argon. The charge yields 100% of minus 100 mesh powder of which 40% is minus 230 mesh. To further reduce the powder, a 5-pound charge is ballmilled dry for ten hours at 60 r.p.m. to obtain at least 95% minus 325 mesh powder. The mill is a four-quart steel mill (8 inches diameter) and contains approximately five pounds of tungsten carbide inserts (¼" × ½" × ½"). Solid bars (¼" × ½" × 2") are then made by hot pressing the composition in graphite dies at pressures ranging from 0.5 to 1.5 tons/sq. in. and temperatures between 2100° F. and 2250° F. for periods of one minute to approximately twenty minutes. The maximum $R_A$ hardness is 82–84 and the average room temperature ultimate tensile strength for these bars is 130,000 p.s.i.

Examples 11–13

The advantages of using the alloys of the invention in lieu of tool steels in high temperature applications is illustrated by comparing the performance and operating characteristics of each type material in actual service. Results of aluminum extrusion, brass extrusion, and steel coining of engine valves using both type materials is shown below.

The aluminum extrusion experiments of Example 11 are conducted on a 2,500 ton hydraulic tube extrusion press. This press requires a cast aluminum billet 9" dia. × 28" long. The initial work is the extrusion of 1.6" dia. tube (1.375" dia. internal dia.) using 6063 aluminum (0.4% Si. 0.7% Mg, Bal Al). The billet preheat temperature is 800° F. The extrusion tooling is preheated to 400° F. Using nitrided commercial tool steel (91.05% Fe, 5.25% Cr, 1.25% Mo, 1.00% Si, 1.05% V, 0.40% C) for the extrusion die and mandrels results in an average maximum extrusion speed of 225 ft./min. Although a graphite-oil lubricant is applied to the die face prior to each extrusion, the dies usually pick up sufficient aluminum on the bearing of the die to start scratching and galling of the extrudate, thus resulting in poor surface finish. These commercial tool steel dies require cleaning on the average of every sixth extrusion. The die is cleaned by using a small emery drill attached to the shaft of a hand-held drill tool. This action eventually results in the rounding of the edges of the die thereby necessitating either scrapping or reworking of the die. Commercial cobalt base alloys, have been unsatisfactory for this application due to rapid failure by cracking under load or heat shock.

A die insert of 64.81% Co, 25.6% Mo, 7.19% Cr, 1.8% Si, 0.6% Mn is fabricated from an air cast 3" dia. slug for insertion in a commercial tool steel die case. The insert and case are employed in the same manner as the tool steel die. A total of 187 billets are extruded through the insert at 330 feet per minute without any cleaning being required because of aluminum pick-up or galling on the bearing face.

Free machining brass is used to demonstrate the extrusion tool capabilities of the alloys of this invention for extruding copper base alloys in Example 12. Two inserts for a two part die holder are machined from air cast 3" dia. slugs of the composition 64.1% Co, 25.6% Mo, 7.9% Cr, 1.8% Si, 0.6% Mn. The inserts are designed to extrude a 0.344" round brass rod. The entrance design of the inserts has a straight 30° included angle cone leading directly into the bearing area. The temperature of the billets is 1450° F. The press liner is 800° F. and the dies are heated to 900° F. Twenty 8" dia. by 32" long billets are pushed through the two-insert die tool and tool wear is measured for comparison with commercial tool steel wear. No tool wear or flow of metal is observed for the inserts made from the cobalt-base alloy. Up to 0.060" closure can normally be experienced for a tool steel (73.9% Fe, 12.00% Cr, 0.30% Mn, 0.50% Si, 12.00% W, 1.00% V, 0.30% C) conventionally employed for such service under the same conditions in five extrusions.

To evaluate the alloys hereof as steel extrusion tool material in Example 13, an automatic valve toggle press is selected. This equipment automatically extrudes steel valve stems and then coins the valve to final shape. The dies conventionally employed are made of a tool steel (91.05% Fe, 5.25% Cr, 1.25% Mo, 1.00% Si, 1.05% V, 0.40% C) and last between one or two hours during which time between 1,000 and 2,000 valves are produced depending on whether the valve being made is an intake valve (SAE 1047 steel) or an exhaust valve (20 to 22% Cr, 1.475 to 0.575% C, 8 to 10% Mn, 3.5 to 4.5% Ni, Bal. Fe). Each machine has two double die sets; a set consisting of one extrusion die and one coin die.

The heated slug of steel (1850° F. for plain carbon steel and 2150° F. for alloy steel) is dropped into the extrusion die where the stem of the valve is extruded and part of the unextruded material is left at the top of the stem. In the next operation, the extruded valve is lifted off and placed into the next cavity which contains the coining die. The stem of the valve easily passes through the hole in the coining die and as the punch comes down, the mass of metal on top of the stem is flattened out to form the head of the valve. In the meantime, the next heated slug has dropped into the extrusion die cavity for extrusion. Toggle presses operate at the rate of 16 strokes/min., in forming the exhaust valves; and about 32 strokes/min. in forming the intake valves. Voluminous amounts of water-base graphite lubricant is used in the dies. Failure occurs when the dies are washed out.

An exhaust coining die machined from an air cast billet of 64.1% Co, 25.6% Mo, 7.9% Cr, 1.8% Si, 0.6% Mn (the alloy of the invention) produces 2,800 valves. The die fails by cracking. The valves coined by the die made of this alloy are dimensionally exact. In contrast to this, the conventional tool steel dies have a life of only 1,000 to 2,000 valves and show gradual wear during their life causing the valve-head dimensions to vary.

Example 14

The corrosion resistance and the high hardness values of articles of the alloys of this invention suggest the use of this alloy in a number of industrial applications that involve both wear and corrosion. One such application is a chemical pump seal and another application is a grinder wheel in an impact mill for breaking up chemical sludge. A simulated performance test for evaluating candidate materials as mechanical seals comprises rotating a 2½" dia. seal against a graphite stationary seal at a speed of 3,500 r.p.m. and a pressure of 100 p.s.i. for 100 hours using water as the liquid medium. The controlled variables are the pressure exerted on the seal faces and the water temperature. The measurement of the total wear (carbon seal wear plus mechanical seal wear) is used as the performance criteria. A wear rate of 0.00083" or less per 100 hours is acceptable; anything over this is considered a failure. This wear rate is based on actual life performance of the seal assembly of ⅛" in 15,000 hour service. Under these conditions, 85 p.s.i.g. pressure has been established as the maximum for almost 95% of the seal materials now in use. Among these materials are stainless steel and aluminum oxide.

A test seal is machined from an air cast billet (¾" × 4" × 6") of the composition 63.8% Co, 25.6% Mo, 7.9% Cr, 1.8% Si, 0.6% Mn, 0.3% C. The bearing surface is lapped to within 10 lightbands of flatness and then polished on metallographic felt laps to bring the surface of the seal into relief. The relief is a result of the relative hardnesses and wear rates of the several phases. The relief polish causes the harder phases to stand out above the softer matrix phase. The relative height of the harder phases above the matrix depends on the extent of polishing and on the composition selected for relief polishing. Approximately fifteen minutes of relief polishing results in a relief of approximately 5 to 10 microns. A mixture of 10 ml. $HNO_3$, 20 ml. HCl, 40 ml. glycerol applied for 30 seconds to the polished surface enhances the relief effect. This relief polishing has been found necessary for the cobalt-base alloys hereof to permit immediate smooth operation of the seal and to minimize carbon wear during the breaking-in period. It is believed that relief polishing affords some mode of hydrodynamic lubrication between the seal insert and carbon by the water. The composition tested does not wear at all during the 100 hour test at 100 p.s.i. and the graphite wear is 0.0001 inch. By comparison, stainless steel seals commonly employed seize and gall at this pressure and speed. At the same speed and only 55 p.s.i.g. pressure a stainless steel seal exhibits a wear of approximately 0.001 inch.

Example 15

Alumina coated nickel-base alloy (62% Ni, 30% Mo, Bal. Fe) is found to have a wear rate of 23 mils per year in a simulated test of the action of a grinding wheel on an impact mill breaking up the bottom sludge in a cooling vessel. The simulated test duplicates the environment which contains benzonitrile, copper cyanide, amine hydrochlorides, and some fluorides and consists of rotating a test specimen in the sludge at 3450 r.p.m. for 210 minutes at 212° F. A test coupon machined from an air cast billet (¾" × 4" × 6") of 64.1% Co, 25.6% Mo, 7.9% Cr, 1.8% Si, 0.6% Mn, representing an alloy of the invention, exhibits an erosion rate of 7 mils per year.

Example 16

To demonstrate the criticality of the compositional limits of the alloys of this invention, the components of an actual conventional seal operating with a carbon graphite sleeve on a two inch diameter shaft are made from alloys within and outside the compositional limits. The shaft speed is 2500 r.p.m. The seal fluid is water at 100 p.s.i.g. and the ambient temperature is 100 to 140° F. The seal pressure can be varied from 50 p.s.i.g. to 300 p.s.i.g The test time is 100 hours and the total wear of the carbon-graphite mating material plus the metal surface is used as the performance criteria. The seal face temperature is measured as a means of monitoring the seal performance in operation. Erratic temperature fluctuations and high seal face temperatures are an indication of rapid seal face wear.

A stellite weld overlay on steel, conventionally used in a seal, causes the carbon-traphite to wear at the maximum allowable rate of 0.00083 inch per 100 hours at a pressure of 50 p.s.i.g. under the conditions described above. A seal component, machined from an air cast billet of 26% molybdenum, 9.0% chromium, 1.8% silicon, 0.6% manganese, no carbon, and the balance cobalt, causes the carbon-graphite to wear only 0.0001 inch in 100 hours. Thus, the above test clearly indicates the superiority of the alloys of this invention over the currently employed stellite overlays as a mating face against carbon-graphite in water under the above conditions. The alloy component exhibits no wear.

Using the same alloy composition, but increasing the seal pressure to 100 p.s.i.g. increases the wear of the carbon-graphite seal component in a duplicate test to .044 to .048 inch to 100 hours. But this greater wear rate can be overcome by adding carbon to the alloy. That carbon is beneficial at higher seal operating pressures is shown by the fact that the above alloy containing an additional 0.36% carbon causes the carbon-graphite to wear only 0.0001 inch in 100 hours at 100 p.s.i.g.

That the chromium content is critical at higher seal operating pressures is shown by the fact that an alloy containing 28% molybdenum, 2.0% silicon, balance cobalt and chromium wass tested at three chromium contents: none, 8% and 16%. At 100 p.s.i.g. and 100 hours under the above conditions the carbon-graphite wear is 0.044, 0.0001, 0.136 inch respectively. The limits on the molybdenum content are similarly critical.

What is claimed is:

1. An alloy composition consisting essentially of at least 50% cobalt, 14–30% molybdenum, 6–12% chromium and 0.5–4% silicon, said alloy having a microstructure containing 30–60 volume percent of a hard Laves phase and, correspondingly, 40–70 volume percent of a solid solution matrix phase.

2. An alloy composition as in claim 1 wherein the amount of cobalt is at least 54%.

3. An alloy composition as in claim 1 wherein the amount of molybdenum is 26–28%.

4. An alloy composition as in claim 1 wherein the amount of chromium is 8–12%.

5. An alloy composition as in claim 1 wherein the amount of silicon is 0.5–2%.

6. An alloy composition consisting essentially of at least 50% cobalt, 14–30% molybdenum, 6–12% chromium, 0.5–4% silicon, up to 10% iron, up to 2% manganese and up to 1% carbon, said alloy having a microstructure containing 30–60 volume percent of a hard Laves phase and, correspondingly, 40–70 volume percent of a solid solution matrix phase.

7. An alloy composition as in claim 6 wherein the amount of carbon is 0.2–0.5%.

8. A powder metallurgy composition consisting essentially of fine particles of an alloy having a size wherein 95% pass a minus 240 mesh screen, said alloy consisting essentially of at least 50% cobalt, 14–30% molybdenum, 6–12% chromium and 0.5–4% silicon, said alloy having a micro-structure containing 30–60 volume percent of a hard Laves phase and, correspondingly, 40–70 volume percent of a solid solution matrix phase.

9. A powder metallurgy composition considering essentially of fine particles of an alloy having a size wherein 95% pass a minus 240 mesh screen, said alloy consisting essentially of at least 54% cobalt, 26–28% molybdenum, 8–12% chromium, 0.5%–2% silicon and 0.2–0.5% carbon, said alloy having a micro-structure containing 30–60 volume percent of a hard Laves phase and, correspondingly, 40–70 volume percent of a solid solution matrix phase.

10. A shaped article consisting essentially of two phases from an alloy composition, 30–60 volume percent of a Laves phase having the generic formula $Mo_2Co_3Si$ and, correspondingly, 40–70 volume percent of a second phase of a solid solution of a matrix phase of a composition containing about 75% by weight cobalt, said alloy consisting of at least 50% cobalt, 14–30% molybdenum, 6–12% chromium and 0.5–4% silicon.

11. A shaped article consisting essentially of two phases from an alloy composition, 30–60 volume percent of a Laves phase having the generic formula $Mo_2Co_3Si$ and, correspondingly, 40–70 volume percent of a second phase of a solid solution of a matrix phase containing about 75% by weight cobalt, said alloy consisting essentially of at least 54% cobalt, 26–28% molybdenum, 8–12% chromium and 0.5–2% silicon.

* * * * *